United States Patent
Ohgi et al.

(10) Patent No.: US 11,173,539 B2
(45) Date of Patent: Nov. 16, 2021

(54) HYDRAULIC COMPOSITION FOR ADDITIVE MANUFACTURING DEVICE AND METHOD OF MANUFACTURING CASTING MOLD

(71) Applicant: TAIHEIYO CEMENT CORPORATION, Tokyo (JP)

(72) Inventors: Yoshifumi Ohgi, Chiba (JP); Yoji Ogawa, Chiba (JP); Yusuke Ishii, Chiba (JP); Takeshi Nakazaki, Chiba (JP); Shinya Naka, Chiba (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 0 days.

(21) Appl. No.: 16/629,764

(22) PCT Filed: Jul. 30, 2018

(86) PCT No.: PCT/JP2018/028438
§ 371 (c)(1),
(2) Date: Jan. 9, 2020

(87) PCT Pub. No.: WO2019/026841
PCT Pub. Date: Feb. 7, 2019

(65) Prior Publication Data
US 2020/0180013 A1 Jun. 11, 2020

(30) Foreign Application Priority Data

| Jul. 31, 2017 | (JP) | JP2017-148518 |
| Dec. 26, 2017 | (JP) | JP2017-249940 |
| Dec. 26, 2017 | (JP) | JP2017-249991 |
| Dec. 26, 2017 | (JP) | JP2017-250003 |
| Dec. 26, 2017 | (JP) | JP2017-250015 |

(51) Int. Cl.
| *B22C 1/18* | (2006.01) |
| *B28B 1/30* | (2006.01) |
| *C04B 22/08* | (2006.01) |
| *C04B 24/26* | (2006.01) |
| *C04B 28/06* | (2006.01) |
| *C04B 111/00* | (2006.01) |

(52) U.S. Cl.
CPC ............ *B22C 1/18* (2013.01); *B28B 1/30* (2013.01); *C04B 22/08* (2013.01); *C04B 24/2623* (2013.01); *C04B 28/06* (2013.01); *C04B 2111/00181* (2013.01); *C04B 2111/00939* (2013.01)

(58) Field of Classification Search
CPC ..... C04B 22/08; C04B 24/2623; C04B 28/06; C04B 2111/00181; C04B 2111/00939; B22B 1/30; B22C 1/18
See application file for complete search history.

(56) References Cited

U.S. PATENT DOCUMENTS 9,181,130 B2 * 11/2015 Dombrowski ............ C08J 3/12

FOREIGN PATENT DOCUMENTS

| CN | 104310918 A | * | 1/2015 | ............ C04B 28/06 |
| CN | 106365475 A | * | 2/2017 | |
| JP | 56092153 A | * | 7/1981 | |
| JP | 57106560 A | * | 7/1982 | |
| JP | 2013-006760 A | | 1/2013 | |
| JP | 5479530 B | | 2/2014 | |
| JP | 2017123796 A | * | 7/2017 | |
| WO | 2013/054833 A1 | | 4/2013 | |
| WO | WO-2013054833 A1 | * | 4/2013 | ............ B22C 1/181 |

OTHER PUBLICATIONS

International Preliminary Report on Patentability of the International Searching Authority dated Feb. 4, 2020 issued in corresponding International Patent Application No. PCT/JP2018/028438 (and English translation).
Hiroshi Inoie et al. "Effects of Compounding Materials on High Heat Resistant Mold Making Using Inkjet 3D Printer." Proceedings of the 163rd Meeting of the Japan Foundry Engineering Society. Oct. 2013. p. 74. (and English translation).
Tetsuo Nakazawa et al. "Improvement of Self-Hardening Mold Bonded by Polyvinyl Alcohol." The Journal of the Japan Foundrymen's Society. 1984. Vol. 56, No. 8. pp. 473-478. (and English translation).
Office Action dated Jul. 15, 2021 issued in corresponding TW Patent Application No. 107126304 (and English translation).

* cited by examiner

*Primary Examiner* — Anthony J Green
(74) *Attorney, Agent, or Firm* — Posz Law Group, PLC

(57) ABSTRACT

A hydraulic composition for an additive manufacturing device has an excellent initial flexural strength development property and dimensional stability. The hydraulic composition includes 1.5 to 14 parts by mass of a polymer with respect to 100 parts by mass of an inorganic binder. In addition, in a hydraulic composition for an additive manufacturing device, the inorganic binder may contain 50 to 100 mass % of a calcium aluminate with respect to 100 mass % of the entire inorganic binder, and in a hydraulic composition for an additive manufacturing device the inorganic binder, may contain 0 to 50 mass % of rapid hardening cement with respect to 100 mass % of the entire inorganic binder.

14 Claims, No Drawings

HYDRAULIC COMPOSITION FOR ADDITIVE MANUFACTURING DEVICE AND METHOD OF MANUFACTURING CASTING MOLD

TECHNICAL FIELD

The present invention relates to a hydraulic composition for an additive manufacturing device (3D printer) having an excellent initial strength development property and dimensional stability, and a method of manufacturing a casting mold using the composition.

BACKGROUND ART

Casting is a traditional metal processing method in which a molten metal is injected into a casting mold to produce a casting. Self-hardening casting molds used for this casting include organic types and inorganic types depending on a caking additive (binding material) that is used. Among these, the inorganic types mainly include a water glass type and a cement type. However, in a cement-based self-hardening casting mold, depending on the casting temperature, gypsum contained therein is thermally decomposed to generate a gas, defects occur in the casting, and an aesthetic appearance and functions are impaired. In addition, in manufacturing of the casting mold, production of a model or a wooden mold is essential as a preprocess, and the preprocess requires time and cost.

Therefore, a casting mold production method that does not impair an aesthetic appearance and the like of a casting and does not require the preprocess is desired.

Incidentally, recently, additive manufacturing devices have been receiving focus as quick and precise molding devices. Among the additive manufacturing devices, for example, a powder lamination molding device is a device in which a powder is provided on a flat surface, an aqueous binder is then injected into the powder and solidified, and the solidified material is sequentially laminated in the vertical direction for molding. Features of the device include that 3D mold data produced by a 3D CAD or the like is divided into a large number of horizontal planes, and the shapes of these horizontal planes are sequentially laminated to manufacture a molded article.

Therefore, the preprocess is unnecessary as long as a casting mold can be manufactured using the device, and it is expected that working time and cost can be reduced.

For example, PTL 1 discloses a technology in which, regarding a hydraulic composition for an additive manufacturing device suitable for a binder jetting method (powder lamination molding method), an aqueous binder is added to a material in which 15% to 50% of rapid hardening cement is combined and kneaded (mixed) with fire sand such as silica sand, olivine sand, or artificial sand, and the material is solidified and laminated to obtain a molded article. Here, the binder jetting method is a method in which a molding solution is added dropwise or sprayed to a powder material in a predetermined range placed on a loading table (pedestal) via a nozzle of an inkjet or the like for solidification, and solidified layers are sequentially laminated to mold a desired shape.

However, since the molded article produced by the additive manufacturing device using the material described in PTL 1 has an insufficient initial strength development property, particularly flexural strength, defects easily occur and it is difficult to supply the product stably, and manufacture of a finely shaped product which is a feature of molding technology according to the additive manufacturing device may be difficult.

In addition, if dimensional changes such as contraction and expansion occur after molding, cracks and breakage may occur. In addition, if sizes of a molded article such as a manufactured casting mold vary, it is necessary to perform an operation of adjusting sizes of the molded product.

CITATION LIST

Patent Literature

[PTL 1] Japanese Patent Application Publication No. 2011-51010

SUMMARY OF INVENTION

Technical Problem

Therefore, the present invention provides a hydraulic composition for an additive manufacturing device having an excellent initial flexural strength development property and dimensional stability.

Solution to Problem

The inventors conducted extensive studies in order to solve the above problems, and as a result, found that a hydraulic composition for an additive manufacturing device having the following configuration can achieve the above object, and thus completed the present invention.

That is, the present invention provides a hydraulic composition for an additive manufacturing device having the following configuration and the like.

[1] A hydraulic composition for an additive manufacturing device, including:
1.5 to 14 parts by mass of a polymer with respect to 100 parts by mass of an inorganic binder.

[2] The hydraulic composition for an additive manufacturing device according to [1], wherein the inorganic binder contains 50 to 100 mass % of a calcium aluminate with respect to 100 mass % of the entire inorganic binder.

[3] The hydraulic composition for an additive manufacturing device according to [1] or [2], wherein the inorganic binder contains 0 to 50 mass % of rapid hardening cement with respect to 100 mass % of the entire inorganic binder.

[4] The hydraulic composition for an additive manufacturing device according to any one of [1] to [3], wherein the polymer is a polymer having an average particle diameter of 150 μm or less.

[5] The hydraulic composition for an additive manufacturing device according to [4], wherein the polymer is a polymer that has been pulverized simultaneously with the inorganic binder.

[6] The hydraulic composition for an additive manufacturing device according to any one of [1] to [5], wherein the polymer is a partially saponified polyvinyl alcohol.

[7] The hydraulic composition for an additive manufacturing device according to any one of [1] to [6], wherein the inorganic binder contains 0 to 50 mass % of cement of which setting initial time measured according to JIS R 5210 is within 3.5 hours with respect to 100 mass % of the entire inorganic binder.

[8] The hydraulic composition for an additive manufacturing device according to any one of [1] to [7], further including:

28 to 100 parts by mass of water with respect to a total of 100 parts by mass of the inorganic binder and the polymer; and sand.

[9] The hydraulic composition for an additive manufacturing device according to [8], wherein an ignition loss of a molded article at a material age of 3 days is 6.5 mass % or less.

[10] A method of manufacturing a casting mold, including molding a casting mold using an additive manufacturing device and the hydraulic composition for an additive manufacturing device according to any one of [1] to [9].

[11] The method of manufacturing a casting mold according to [10], wherein a curing temperature of the casting mold is 10° C. to 100° C.

Advantageous Effects of Invention

In the hydraulic composition for an additive manufacturing device of the present invention, an initial strength development property and dimensional stability are improved, de-powdering is easy, powder is blown out (the powder falls onto the surface) from the molded article, the molded article is separated, and there is no bleeding of water from the molded article (bleeding of water outside a molding range during molding).

DESCRIPTION OF EMBODIMENTS

As described above, the present invention provides a hydraulic composition for an additive manufacturing device (hereinafter abbreviated as a "hydraulic composition" in some cases) including 1.5 to 14 parts by mass of a polymer with respect to 100 parts by mass of an inorganic binder and the like. Hereinafter, in the present invention, an inorganic binder, a polymer, water and sand, other components in the hydraulic composition, and a method of manufacturing a casting mold will be described separately.

1. Inorganic Binder

The inorganic binder is an inorganic binding material that contains one or more selected from the following calcium aluminates as an essential component, and further contains gypsum, rapid hardening cement, and like as optional components.

Next, calcium aluminates, gypsum, rapid hardening cement, and the like will be separately described in detail.

(1) Calcium Aluminates

Examples of calcium aluminates include one or more selected from calcium aluminates such as $3CaO.Al_2O_3$, $2CaO.Al_2O_3$, $12CaO.7Al_2O_3$, $5CaO.3Al_2O_3$, $CaO.Al_2O_3$, $3CaO.5Al_2O_3$, and $CaO.2Al_2O_3$; calcium aluminoferrites such as $2CaO.Al_2O_3.Fe_2O_3$ and $4CaO.Al_2O_3.Fe_2O_3$; calcium haloaluminates containing calcium fluoroaluminate such as $3CaO.3Al_2O_3.CaF_2$ and $11CaO.7Al_2O_3.CaF_2$ in which a halogen is solid-solubilized or substituted in calcium aluminate; calcium sodium aluminates such as $8CaO.Na_2O.3Al_2O_3$ and $3CaO.2Na_2O.5Al_2O_3$; calcium lithium aluminate; alumina cement; and additionally, minerals in which a trace element (including an oxide and the like) such as Na, K, Li, Ti, Fe, Mg, Cr, P, F, or S is solid-solubilized.

Among these calcium aluminates, calcium aluminate is preferable because it has a high strength development property and an amount of a gas generated when it is used in a casting mold decreases, and amorphous calcium aluminate is particularly preferable. Amorphous calcium aluminate is produced by melting a raw material and then rapidly cooling it so that there is substantially no crystal structure, and generally, the percentage of glass content is 80% or more, and as the percentage of glass content increases, the initial strength development property is improved, and thus the percentage of glass content is preferably 90% or more.

The molar ratio of $CaO/Al_2O_3$ of a calcium aluminate is preferably 1.5 to 3.0, and more preferably 1.7 to 2.4. When the molar ratio is 1.5 or more, an initial strength development property of the hydraulic composition is improved and when the molar ratio is 3.0 or less, the heat resistance of the hydraulic composition increases.

In addition, the Blaine specific surface area (fineness defined in JIS R 5201) of a calcium aluminate is preferably 1,000 to 6,000 $cm^2/g$, and more preferably 1,500 to 5,000 $cm^2/g$ so that a sufficient initial strength development property is obtained and the occurrence of dust is reduced. Here, the Blaine specific surface area of a calcium aluminate is more preferably 1,500 to 3,500 $cm^2/g$, and particularly preferably 1,500 to 2,500 $cm^2/g$ so that spread according to the additive manufacturing device is uniform, and the strength of the casting mold does not decrease.

The content of calcium aluminates in the inorganic binder is preferably 50 to 100 mass %. When the value is 50 mass % or more, the initial strength development property and heat resistance of the hydraulic composition are improved. Here, the value is preferably 60 to 100 mass %, more preferably 70 to 100 mass %, and most preferably 80 to 95 mass %.

(2) Gypsum

The inorganic binder may further contain gypsum as an optional component in order to further improve the initial strength development property. Examples of gypsum include one or more selected from anhydrous gypsum, hemihydrate gypsum, and dihydrate gypsum. Among these, hemihydrate gypsum is preferable because it further improves an initial strength development property. In order to improve an initial strength development property, and prevent gas generation and poor graphite spheroidization during casting manufacture, the content of gypsum in the inorganic binder in terms of anhydrous gypsum is preferably 0 to 10 mass %, more preferably 0.5 to 5 mass %, most preferably 0.8 to 3 mass %, and particularly preferably 1 to 2 mass % with respect to 100 mass % of the entire inorganic binder.

Here, the gypsum may be gypsum contained in cement. Gypsum in cement is generally provided in the form of a mixture containing dihydrate gypsum and hemihydrate gypsum (gypsum mixture). Since hemihydrate gypsum is generated when dihydrate gypsum is dehydrated due to heat generated when cement is pulverized, content proportions of hemihydrate gypsum and dihydrate gypsum vary depending on pulverizing conditions.

(3) Rapid Hardening Cement

In order to further improve an initial strength development property, the inorganic binder can contain rapid hardening cement (super-rapid hardening cement) as an optional component. Rapid hardening cement (super-rapid hardening cement) or still water cement of which setting initial time measured according to JIS R 5210 is within 30 minutes is preferable. Here, examples of commercial rapid hardening cement products and the like include Super Jet Cement (manufactured by Taiheiyo Cement Corporation), Jet-Cement (manufactured by Sumitomo Osaka Cement Co., Ltd.), Lion Shisui (registered trademark, manufactured by Sumitomo Osaka Cement Co., Ltd.), and Denka Super Cement (manufactured by Denka Company Limited). Among them, rapid hardening cement containing gypsum is preferable because it improves an initial strength development property and a small amount of gypsum can easily be added.

In order to improve an initial strength development property and reduce generation of a gas when it is used in a casting mold, the content of the rapid hardening cement in the inorganic binder is preferably 0 to 50 mass %, more preferably 0 to 30 mass %, and most preferably 5 to 20 mass % with respect to 100 mass % of the entire inorganic binder.

(4) Other Optional Components in Inorganic Binder

The inorganic binder may contain cement as another optional component. Regarding the cement, setting initial time measured according to JIS R 5210 is preferably within 3 hours and 30 minutes because this improves an initial strength development property after 3 hours from the end of molding, and is more preferably within 1 hour. In order to improve an initial strength development property, the content of the cement in the inorganic binder is preferably 0 to 50 mass %, more preferably 0 to 30 mass %, and most preferably 0 to 20 mass % with respect to 100 mass % of the entire inorganic binder.

Examples of cement include one or more selected from ordinary Portland cement, high early strength Portland cement, moderate heat Portland cement, low heat Portland cement, white Portland cement, eco cement, blast furnace cement, fly ash cement, and cement clinker powder. Here, in the present invention, cement clinker powder is also included in the cement.

In addition, the content of calcium silicate in the cement is preferably 25 mass % or more with respect to 100 mass % of the entire cement. When the content is 25 mass % or more, a strength development property is improved after 1 day of a material age. In addition, when a long-term strength development property is required, the content is preferably 45 mass % or more.

2. Polymer

In order to increase the strength of the hydraulic composition, the content of the polymer in terms of solid content is 1.5 to 14 parts by mass with respect to 100 parts by mass of the inorganic binder. When the content of the polymer is less than 1.5 parts by mass, a strength improving effect is weak, and when the content of the polymer exceeds 14 parts by mass, deformation or cracks occur depending on the shape due to contraction of the molded article, and it is not possible to manufacture a casting mold having a complicated shape. Here, the content of the polymer is preferably 3 to 12 parts by mass, and more preferably 4 to 10 parts by mass with respect to 100 parts by mass of the inorganic binder.

According to a polymer form, the polymer is a polymer dispersion, a redispersible powder resin, or the like defined in JIS A 6203. In addition, according to the type of the polymer, examples thereof include one or more selected from a polyacrylate ester, a vinyl acetate copolymer, an ethylene/vinyl acetate copolymer, a styrene/butadiene copolymer, a vinyl acetate/vinyl versatate copolymer, a vinyl acetate/vinyl versatate/acrylate terpolymer, a polyvinyl alcohol, maltodextrin, an epoxy resin, and a urethane resin.

Among them, in order to improve solubility and a strength development property, a polyvinyl alcohol (partially or completely saponified polyvinyl acetate) is preferable, a partially saponified polyvinyl alcohol is more preferable, and a polyvinyl alcohol having a degree of saponification of 80 to 90 mol % is most preferable.

In addition, in order to obtain an initial strength development property, the particle size of the polymer is preferably an average particle diameter (median diameter, D50) of 150 μm or less, more preferably 110 μm or less, most preferably 90 μm or less, and particularly preferably 10 to 75 μm. In addition, the content of polymer particles having a size of larger than 94 μm is preferably 80 mass % or less, more preferably 45 mass % or less, and most preferably 30 mass % or less. In addition, the content of polymer particles having a size of larger than 77 μm is preferably 80 mass % or less, more preferably 60 mass % or less, and most preferably 50 mass % or less.

If the particle size of the polymer is indicated by the residue of the sieve, preferably, the residue of a sieve having a sieve opening of 90 μm is 10 mass % or less, and more preferably, the residue of a sieve having a sieve opening of 75 μm is 10 mass % or less.

Regarding a method of pulverizing and mixing the inorganic binder and the polymer, there are individual pulverization in which both are individually pulverized and then mixed and simultaneous pulverization in which they are mixed and then simultaneously pulverized together. In consideration of time and effort for pulverization and the strength development property, simultaneous pulverization is preferable. In simultaneous pulverization of the inorganic binder and the polymer, all of the inorganic binder and the polymer may be simultaneously pulverized, or some of the inorganic binder and the polymer may be simultaneously pulverized.

The polymer in a powder state may be used by being mixed with an inorganic binder, or may be used by being dissolved in water as will be described below.

3. Water and Sand

According to another form of the hydraulic composition of the present invention, the hydraulic composition for an additive manufacturing device according to [1] to [7] is a composition that further contains 28 to 100 parts by mass of water with respect to a total of 100 parts by mass of the inorganic binder and the polymer, and sand. When the content of water is within the above range, it is possible to secure a strength development property. Here, in order to increase the strength and dimensional accuracy of the casting mold, the content of water is preferably 30 to 65 parts by mass, more preferably 32 to 60 parts by mass, and most preferably 35 to 46 parts by mass. Regarding the water, tap water, well water, or the like can be used. In addition, in order to impart various required functions, water may be used by being mixed with one or more selected from a thickener, a lubricant, a superplasticizer, a surfactant, and a surface tension reducing agent.

In addition, the content of sand is preferably 100 to 600 parts by mass, more preferably 150 to 500 parts by mass, and most preferably 200 to 400 parts by mass with respect to 100 parts by mass of the inorganic binder. When the content of sand is within this range, a strength development property is improved. The sand is not particularly limited as long as it is fire sand, and examples thereof include one or more selected from silica sand, olivine sand, zircon sand, chromite sand, alumina sand, and artificial sand.

4. Other Components in Hydraulic Composition

In order to facilitate an operation (de-powdering) of removing uncured powder of the hydraulic composition remaining after molding from the molded article, the hydraulic composition of the present invention can further contain preferably 0.1 to 2.0 parts by mass, and more preferably 0.5 to 1.5 parts by mass of hydrophobic fumed silica as an optional component with respect to 100 parts by mass of a total of the inorganic binder. Here, the hydrophobic fumed silica is a silica powder of which a surface becomes hydrophobic by treating the surface of the fumed silica with silane or siloxane.

In addition, in order to further improve powder removal efficiency of the hydraulic composition, the BET specific surface area of hydrophobic fumed silica is preferably 30 to 300 $m^2/g$. When the BET specific surface area of hydrophobic fumed silica is within this range, fluidity of the powder is improved, the surface spread by the additive manufacturing device is flat, and the weight of the casting mold can be reduced without reducing the strength. In addition, hydrophobic fumed silica has an effect of preventing powder consolidation and improving mixing properties.

Here, the hydraulic composition of the present invention may further contain optional components such as a blast furnace slag, fly ash, silica fume, silica fine powder, and limestone powder as a material for adjusting a strength development property. In addition, the hydraulic composition of the present invention may contain, as a hardening accelerator, alkali metal carbonate, alkali metal lactate, alkaline earth metal lactate, alkali metal silicate, and the like as optional components.

5. Method of Manufacturing Casting Mold

The manufacturing method is a method of producing a molded article using an additive manufacturing device and a hydraulic composition of the present invention and manufacturing a casting mold. The additive manufacturing device is not particularly limited, and a commercial or the like product such as a powder laminate additive manufacturing device can be used. In addition, a hydraulic composition before water is contained is prepared by mixing components of the hydraulic composition using a commercial mixer or according to a manual operation. Here, when a plurality of materials are used as binding materials, the binding materials may be mixed in advance using a commercial mixer or according to a manual operation, and may be simultaneously pulverized using a pulverizing machine.

Examples of a molded article curing method include air curing alone, a method in which air curing is performed and water curing is then performed, and surface impregnation curing. Among them, in order to improve an initial strength development property and reduce an amount of water vapor generated during manufacture of casting, air curing alone is preferable. In addition, in order to increase the strength according to calcium aluminate, rapid hardening cement, polyvinyl alcohol, or the like, the temperature of air curing is preferably 10° C. to 100° C., and more preferably 30° C. to 80° C. In addition, in consideration of sufficient strength development and production efficiency, the relative humidity of air curing is preferably 10% to 90%, more preferably 15% to 80%, and most preferably 20% to 60%. In addition, in order to obtain a sufficient strength development property and improve production efficiency, the air curing time is preferably 1 hour to 1 week, more preferably 2 hours to 5 days, and most preferably 3 hours to 4 days.

When it is used in a casting mold, in consideration of practicality, the target value of flexural strength is preferably 1.0 $N/mm^2$ or more at a material age of 3 hours, and preferably 2.0 $N/mm^2$ or more at a material age of 3 days. In addition, the dimensional stability is preferably in a range of 100±5%.

In addition, the ignition loss of the molded article at a material age of 3 days using the hydraulic composition is preferably 6.5 mass % or less, more preferably 5.0 mass % or less, and most preferably 4.5 mass % or less. When the ignition loss is 6.5 mass % or less, there are no defects such as blow holes and the like in the casting. Here, the ignition loss is an index indicating an amount of a gas generated when it is used in a casting mold, and the gas contains water, a sulfur content, and the like. In addition, the ignition loss may be measured when the molded article is used as a casting mold or when curing is completed. However, for more strict management, preferably after curing for 3 days, and more preferably after curing for 3 hours, heating is directly performed at 1,400° C. so that the weight is constant without drying or pulverizing the molded article, and the mass of the molded article before and after heating is measured, and calculation is performed based on the formula of a difference in mass of the molded article before and after heating×100/the mass of the molded article before heating.

EXAMPLES

While the present invention will be described below with reference to examples, the present invention is not limited to these examples.

1. Materials Used (1) Calcium aluminates (abbreviation: CA)
(i) Amorphous calcium aluminate trial product (abbreviation: CA1)
The molar ratio of $CaO/Al_2O_3$ was 2.2, the percentage of glass content was 95% or more, and the Blaine specific surface area was 2,040 $cm^2/g$.
(ii) Amorphous calcium aluminate trial product (abbreviation: CA2)
The molar ratio of $CaO/Al_2O_3$ and the percentage of glass content were the same as those in CA1, but the Blaine specific surface area was different at 3,490 $cm^2/g$ (abbreviation: CA2).
(2) Rapid hardening cement
Super Jet Cement (manufactured by Taiheiyo Cement Corporation)
The content of calcium silicate was 47 mass %, setting initial time was at 30 minutes, and the Blaine specific surface area was 4,700 $cm^2/g$. However, 14 mass % of anhydrous gypsum was contained.
(4) Sand
The same amounts of the following two types of artificial casting sand were mixed and used.
(i) Alumina type, product name ESPEARL #180L (manufactured by Yamakawa Sangyo Co., Ltd.)
(ii) Alumina type, product name Naigai Cerabeads #1450 (manufactured by Itochu Ceratech Corporation)
(5) Polymer
(i) Vinyl acetate copolymer (abbreviation: v) Part No. D5100P (manufactured by The Nippon Synthetic Chemical Industry Co., Ltd.)

The average particle diameter (median diameter, D50) was 56 μm, the content of particles having a size of larger than 94 μm was 38 mass %, the content of particles having a size of larger than 77 μm was 46 mass %, the 10% diameter (D10) was 14 μm, and the 90% diameter (D90) was 155 μm.
(ii) Polyvinyl alcohol a (abbreviation: a) Part No. 22-88 S1 (PVA217SS, manufactured by Kuraray Co., Ltd.)

The degree of saponification was 87% to 89%, the average particle diameter (median diameter, D50) was 60 μm, the content of particles having a size of larger than 94 μm was 29 mass %, the content of particles having a size of larger than 77 μm was 47 mass %, the 10% diameter (D10) was 25 μm, and the 90% diameter (D90) was 121 μm.

Classification of Polyvinyl Alcohol a

A polyvinyl alcohol a was classified using a sieve to produce polyvinyl alcohol classified products having a sieve opening between 75 μm and 150 μm (an average particle diameter of 106 μm, corresponding to "a106" in Table 5 and Table 6), a sieve opening between 45 μm and 75 μm (an average particle diameter of 63 μm, corresponding to "a63" in Table 5 and Table 6), and a sieve opening between 25 μm and 45 μm (an average particle diameter of 38 μm, corresponding to "a38" in Table 5 and Table 6).

In addition, calcium aluminate coarsely pulverized to a particle diameter of 5 mm or less and the polyvinyl alcohol a were mixed to produce a pulverized product (corresponding to "X" in Tables 5 and 6) of the polyvinyl alcohol a pulverized at the same time so that the Blaine specific surface area of calcium aluminate was 2,040 $cm^2/g$. However, it was not possible to measure the particle size of the pulverized product of the polyvinyl alcohol a because it was mixed with calcium aluminate. Therefore, the average particle diameter (median diameter, D50) of calcium aluminate having a Blaine specific surface area of 2,040 $cm^2/g$ was 25 μm, and thus it was estimated that the size was smaller than 25 μm in consideration of grindability.
(iii) Polyvinyl alcohol b (abbreviation: b)
Part No. KP18-88 S1 (manufactured by Kuraray Co., Ltd.)

The degree of saponification was 87% to 89%, the average particle diameter (median diameter, D50) was 57 μm, the content of particles having a size of larger than 94 μm was 30 mass %, the content of particles having a size of larger than 77 μm was 44 mass %, the 10% diameter (D10) was 23 μm, and the 90% diameter (D90) was 123 μm.
(iv) Polyvinyl alcohol c (abbreviation: c)
Part No. 22-88 S1 (PVA217S, manufactured by Kuraray Co., Ltd.)

The degree of saponification was 87% to 89%, the average particle diameter (median diameter, D50) was 113 μm, the content of particles having a size of larger than 94 μm was 81 mass %, the content of particles having a size of larger than 77 μm was 87 mass %, the 10% diameter (D10) was 57 μm, and the 90% diameter (D90) was 162 μm.

Here, all of the particle diameters of the polymers were measured using SALD-2000J (manufactured by Shimadzu Corporation) using silicone oil as a medium.
(6) Hardening accelerator
(i) Lithium carbonate (abbreviation: LC)
Reagent grade 1 (manufactured by Kanto Chemical Industry Co., Inc.)
(ii) Calcium lactate (abbreviation: CL)
Reagent grade 1 (manufactured by Kanto Chemical Industry Co., Inc.)
(7) Hydrophobic fumed silica (abbreviation: FS) Product name AEROSIL RX200 (manufactured by Nippon Aerosil Co., Ltd.)
(8) Water 3 mass % glycerol aqueous solution, binder solution for ProJet660Pro (manufactured by 3D Systems Corporation.)

2. Test 1

(1) Production of Hydraulic Composition and Specimen

The calcium aluminates (CA1 and CA2), rapid hardening cement, sand, hydrophobic fumed silica, a vinyl acetate copolymer, and polyvinyl alcohols a and b were mixed according to formulations shown in Table 1 to produce a powder mixture (hydraulic composition containing no water).

Next, using the powder composition and a binding agent injection type powder lamination molding device (product name: ProJet660Pro manufactured by 3D Systems Corporation.) as an additive manufacturing device, under conditions of 20° C. and a relative humidity of 60%, according to a binding agent injection method, a molded article having a cross-sectional dimension with a height of 10 mm, a width of 16 mm, and a length of 80 mm was produced. The molded article was subjected to air curing under conditions of 40° C. and a relative humidity of 30% for 3 hours to produce a specimen. In addition, in the same manner, casting molds were produced using the hydraulic compositions of Examples 1 to 10 under conditions of 20° C. and a relative humidity of 60%, and the casting molds were subjected to air curing under conditions of 40° C. and a relative humidity of 30% for 3 hours.

Here, in manufacture of the molded article by the device, a predetermined position on the powder mixture was selected, a water amount set value of the device was adjusted, water was injected to the exterior and the interior of the powder mixture via a nozzle, and the powder mixture was solidified. Here, the water amount set value of the device was 65% for the exterior (Shell) and 90% for the interior (Core). The mass ratio of water/(inorganic binder+polymer) (hereinafter referred to as a "water/composite binding material ratio") was 30 to 32 mass % in Examples 1 to 9, and 86 mass % in Example 10.

(2) Measurement of Flexural Strength of Specimen and Dimension of Specimen

Next, using the specimen, a 3-point bending test was performed using a flexural strength test machine (model number: MODEL-2257, manufactured by Aikoh Engineering Co., Ltd.), and the flexural strength of the specimen was measured. The results are shown in Table 1.

As shown in Table 1, the flexural strength of the specimen produced using only an inorganic binder without containing a polymer was low. On the other hand, when a large amount of the polymer was contained, deformation may occur. In addition, when rapid hardening cement containing gypsum was added in addition to calcium aluminate, the flexural strength of the specimen increased, and when a hardening accelerator was additionally added, the flexural strength also increased.

TABLE 1

| | Type of CA | Inorganic binder (parts by mass) | | Sand (mass %) | FS (parts by mass) | Polymer (parts by mass) | | | Hardening accelerator (parts by mass) | | Flexural strength (N/mm$^2$) 40° C.-3 h |
|---|---|---|---|---|---|---|---|---|---|---|---|
| | | CA | Rapid hardening cement | | | v | a | b | LC | CL | |
| Example 1 | CA1 | 90 | 10 | 200 | — | 9 | — | — | — | — | 1.12 |
| Example 2 | CA1 | 90 | 10 | 200 | — | — | 3 | — | 6 | — | 2.06 |
| Example 3 | CA1 | 90 | 10 | 200 | — | — | 6 | — | — | — | 1.79 |
| Example 4 | CA1 | 90 | 10 | 200 | — | — | 6 | — | 3 | 3 | 2.12 |
| Example 5 | CA1 | 90 | 10 | 200 | — | — | 9 | — | — | — | 1.95 |
| Example 6 | CA1 | 90 | 10 | 200 | — | — | 12 | — | — | — | 2.30 |
| Example 7 | CA1 | 100 | — | 200 | — | — | 6 | — | — | — | 1.13 |
| Example 8 | CA1 | 90 | 10 | 200 | — | — | — | 6 | — | — | 1.96 |
| Example 9 | CA1 | 90 | 10 | 200 | 1.5 | — | — | 6 | — | — | 1.94 |
| Example 10 | CA2 | 90 | 10 | 600 | — | — | 14 | — | — | — | 3.10 |
| Comparative Example 1 | CA1 | 90 | 10 | 200 | — | — | 15 | — | — | — | Measurement was not possible |
| Comparative Example 2 | CA1 | 90 | 10 | 200 | — | — | — | — | — | — | 0.64 |

Note)
40° C.-3 h indicates that the curing temperature was 40° C. and the curing time was 3 hours.

Note)
"Measurement was not possible" indicates that the specimen was cured and deformed and thus it was not possible to measure the flexural strength.

3. Production of Casting 1

Further, molten aluminum was poured into the casting mold to produce a casting, and in all examples, it was possible to manufacture a casting having a smooth surface.

4. Test 2

90 parts by mass of the calcium aluminate (CA1), 10 parts by mass of rapid hardening cement, 200 parts by mass of sand, and polyvinyl alcohols a and b were mixed according to formulations shown in Table 2 to produce a powder mixture (hydraulic composition containing no water). Here, the specimen was produced, and the flexural strength of the specimen was measured in the same manner as in Test 1. The specimen was produced by performing air curing under conditions of 20° C. or 40° C. and a relative humidity of 30% for 3 to 72 hours. Next, the width and the height of the specimen were measure, and differences from the set dimension were calculated.

As shown in Table 2, when the water/composite binding material ratio was low, the flexural strength of the specimen decreased, and when the water/composite binding material ratio was high, a difference in dimension increased. In addition, when the water/composite binding material ratio was low, de-powdering was difficult, and when the water/composite binding material ratio was high, separation and bleeding easily occurred in the specimen. In addition, when an amount of the polymer added was small, powder was blown out from the specimen (the powder falls), and bleeding easily occurred.

Here, based on the invention described in [8], Examples 17, 22 and 37 corresponded to comparative examples.

TABLE 2

| | Polyvinyl alcohol | | Water/composite binding material ratio (%) | Water amount set value of device | | Curing temperature (° C.) | Flexural strength (N/mm$^2$) | | | Difference in dimension (%) Material age of 3 hours Width |
|---|---|---|---|---|---|---|---|---|---|---|
| | Type | Content (parts by mass) | | Exterior (shell %) | Interior (core %) | | Material age of 3 hours | Material age of 1 day | Material age of 3 days | |
| Example 11 | a | 3.0 | 40 | 100 | 100 | 40 | 2.15 | 3.46 | 4.20 | 2 |
| Example 12 | a | 4.5 | 40 | 100 | 100 | 40 | 2.46 | 3.74 | 3.93 | 2 |
| Example 13 | a | 6.0 | 30 | 65 | 90 | 40 | 2.20 | — | 2.09 | −1 |
| Example 14 | a | 6.0 | 40 | 100 | 100 | 40 | 3.48 | 5.12 | 4.60 | 1 |
| Example 15 | a | 6.0 | 41 | 100 | 100 | 40 | 3.20 | — | 3.83 | 1 |
| Example 16 | a | 9.0 | 30 | 65 | 90 | 40 | 1.95 | — | — | 1 |
| Example 17 | a | 1.5 | 22 | 50 | 50 | 40 | 0.35 | — | 0.49 | −1 |
| Example 18 | a | 1.5 | 41 | 100 | 100 | 40 | 1.77 | — | 2.53 | 8 |

TABLE 2-continued

| | | | | | | | | | | |
|---|---|---|---|---|---|---|---|---|---|---|
| Example 19 | a | 1.5 | 60 | 150 | 150 | 40 | 2.42 | — | 6.47 | 24 |
| Example 20 | a | 3.0 | 46 | 120 | 120 | 40 | 1.95 | 3.72 | 4.67 | 3 |
| Example 21 | a | 3.0 | 58 | 150 | 150 | 40 | 2.15 | 6.67 | 5.75 | 11 |
| Example 22 | a | 6.0 | 21 | 50 | 50 | 40 | 0.67 | — | 0.59 | −1 |
| Example 23 | a | 6.0 | 46 | 120 | 120 | 40 | 2.70 | — | 5.83 | 2 |
| Example 24 | a | 6.0 | 57 | 150 | 150 | 40 | 2.10 | — | 8.58 | 4 |
| Example 25 | b | 3.0 | 39 | 100 | 100 | 40 | 3.23 | 4.48 | 4.46 | 4 |
| Example 26 | b | 4.5 | 39 | 100 | 100 | 40 | 3.46 | 5.20 | 5.01 | 2 |
| Example 27 | b | 6.0 | 31 | 70 | 90 | 40 | 3.81 | — | 4.36 | — |
| Example 28 | b | 6.0 | 32 | 80 | 90 | 40 | 4.22 | 5.81 | — | — |
| Example 29 | b | 6.0 | 33 | 80 | 100 | 40 | 3.81 | 5.61 | — | — |
| Example 30 | b | 6.0 | 34 | 90 | 90 | 40 | 4.01 | 6.90 | — | — |
| Example 31 | b | 6.0 | 39 | 90 | 105 | 40 | 3.93 | 6.17 | — | — |
| Example 32 | b | 6.0 | 39 | 100 | 100 | 40 | 3.59 | 4.90 | — | 1 |
| Example 33 | b | 3.0 | 39 | 100 | 100 | 20 | 3.02 | — | — | 2 |
| Example 34 | b | 4.5 | 39 | 100 | 100 | 20 | 2.91 | — | — | 2 |
| Example 35 | b | 6.0 | 39 | 100 | 100 | 20 | 3.31 | — | — | 1 |
| Example 36 | a | 3.0 | 33 | 65 | 90 | 60 | 2.01 | 1.74 | 2.25 | −1 |
| Example 37 | b | 6.0 | 25 | 50 | 80 | 40 | 0.25 | — | 1.91 | — |

| | Difference in dimension (%) | | | | | Ease of de-powdering | Blow out of powder | Separation | Bleeding |
|---|---|---|---|---|---|---|---|---|---|
| | Material age of 3 hours | Material age of 1 day | | Material age of 3 days | | | | | |
| | Height | Width | Height | Width | Height | ○: favorable, Δ: small amount, X: great | | | |
| Example 11 | 4 | 2 | 3 | 3 | 5 | ○ | ○ | ○ | ○ |
| Example 12 | 2 | 1 | 2 | 4 | 5 | ○ | ○ | ○ | ○ |
| Example 13 | 2 | — | — | 0 | 3 | ○ | ○ | ○ | ○ |
| Example 14 | 2 | 1 | 1 | 1 | 3 | ○ | ○ | ○ | ○ |
| Example 15 | 3 | — | — | 1 | 5 | ○ | ○ | ○ | ○ |
| Example 16 | 3 | — | — | — | — | ○ | ○ | ○ | ○ |
| Example 17 | 4 | — | — | −2 | 3 | X | X | ○ | ○ |
| Example 18 | 9 | — | — | 2 | 10 | Δ | X | ○ | X |
| Example 19 | 18 | — | — | — | — | ○ | ○ | ○ | X |
| Example 20 | 5 | 8 | 11 | 6 | 12 | ○ | ○ | ○ | X |
| Example 21 | 13 | 7 | 8 | 16 | 14 | X | ○ | ○ | X |
| Example 22 | 0 | — | — | −1 | 0 | Δ | X | ○ | ○ |
| Example 23 | 6 | — | — | 2 | 3 | ○ | ○ | ○ | ○ |
| Example 24 | 6 | — | — | 5 | 6 | ○ | ○ | X | Δ |
| Example 25 | 5 | 3 | 5 | 2 | 5 | ○ | ○ | ○ | ○ |
| Example 26 | 3 | 2 | 3 | 1 | 2 | ○ | ○ | ○ | ○ |

TABLE 2-continued

|  |  |  |  |  |  |  |  |  |  |
|---|---|---|---|---|---|---|---|---|---|
| Example 27 | — | — | — | 1 | 2 | ○ | ○ | ○ | ○ |
| Example 28 | — | 1 | 2 | — | — | ○ | ○ | ○ | ○ |
| Example 29 | — | 2 | 2 | — | — | ○ | ○ | ○ | ○ |
| Example 30 | — | 3 | 3 | — | — | ○ | ○ | ○ | ○ |
| Example 31 | — | 2 | 3 | — | — | ○ | ○ | ○ | ○ |
| Example 32 | 2 | 2 | 2 | — | — | ○ | ○ | ○ | ○ |
| Example 33 | 5 | — | — | — | — | ○ | ○ | ○ | ○ |
| Example 34 | 4 | — | — | — | — | ○ | ○ | ○ | ○ |
| Example 35 | 2 | — | — | — | — | ○ | ○ | ○ | ○ |
| Example 36 | 1 | -1 | 2 | -1 | 1 | ○ | ○ | ○ | ○ |
| Example 37 | — | — | — | -1 | 1 | ○ | ○ | ○ | ○ |

Note)
Content indicates parts by mass of polyvinyl alcohol with respect to 100 parts by mass of the inorganic binder. In addition, water/composite binding material ratio indicates mass ratio of water/(inorganic binder + polymer).

Note)
Ease of de-powdering indicates that it was possible to remove powder quickly from the molded article after molding.

Note)
Blow out of powder indicates that powder was blown out from the molded article after de-powdering.

Note)
Separation indicates that the molded article was separated in a thin plate form after de-powdering.

Note)
Bleeding indicates that water injected from a molding device was impregnated outside a spraying range.

5. Test 3

90 parts by mass of the calcium aluminate (CA1), 10 parts by mass of rapid hardening cement, 200 parts by mass of sand, and polyvinyl alcohols a, b and c were mixed according to formulations shown in Table 3 to produce a powder mixture (hydraulic composition containing no water). Here, the specimen was produced, and the flexural strength of the specimen was measured in the same manner as in Test 1.

In addition, the ignition loss of the specimen was measured when the specimen after curing for 3 days was directly heated at 1,400° C. without drying or pulverizing so that the weight was constant, the mass of the molded article before and after heating was measured, and calculation was performed based on the formula of a difference in mass of the molded article before and after heating×100/the mass of the molded article before heating.

In all of the examples, the flexural strength was high and the ignition loss was 6.5 mass % or less.

TABLE 3

|  | Polyvinyl alcohol | | | Water/composite binding material ratio (mass %) | Water amount set value of device | | Curing temperature (° C.) | Flexural strength (N/mm²) | | | Ignition loss at a material age of 3 days (mass %) |
|---|---|---|---|---|---|---|---|---|---|---|---|
|  | Type | Average particle diameter (μm) | Content (parts by mass) |  | Exterior (Shell %) | Interior (Core %) |  | Material age of 3 hours | Material age of 1 day | Material age of 3 days |  |
| Example 38 | a | 60 | 1.5 | 41 | 100 | 100 | 40 | 1.77 | — | 2.53 | 3.7 |
| Example 39 | a |  | 1.5 | 60 | 150 | 150 |  | 2.42 | — | 6.47 | 4.3 |
| Example 40 | a |  | 3.0 | 40 | 100 | 100 |  | 2.15 | 3.46 | 4.20 | 4.2 |
| Example 41 | a |  | 3.0 | 46 | 120 | 120 |  | 1.95 | 3.72 | 4.67 | 4.4 |
| Example 42 | a |  | 3.0 | 58 | 150 | 150 |  | 2.15 | 6.67 | 5.75 | 4.8 |
| Example 43 | a |  | 4.5 | 40 | 100 | 100 |  | 2.46 | 3.74 | 3.93 | 4.7 |
| Example 44 | a |  | 6.0 | 30 | 65 | 90 |  | 2.20 | — | 2.09 | 4.9 |
| Example 45 | a |  | 6.0 | 40 | 100 | 100 |  | 3.48 | 5.12 | 4.60 | 5.2 |
| Example 46 | a |  | 6.0 | 41 | 100 | 100 |  | 3.20 | — | 3.83 | 5.2 |
| Example 47 | a |  | 6.0 | 46 | 120 | 120 |  | 2.70 | — | 5.83 | 5.4 |

TABLE 3-continued

| | Polyvinyl alcohol | | | Water amount set value of device | | Curing temperature (° C.) | Flexural strength (N/mm²) | | | Ignition loss at a material age of 3 days (mass %) |
|---|---|---|---|---|---|---|---|---|---|---|
| | Type | Average particle diameter (μm) | Content (parts by mass) | Water/composite binding material ratio (mass %) | Exterior (Shell %) | Interior (Core %) | | Material age of 3 hours | Material age of 1 day | Material age of 3 days | |
| Example 48 | a | | 6.0 | 55 | 150 | 150 | | 2.10 | — | 8.58 | 5.8 |
| Example 49 | a | | 9.0 | 30 | 65 | 90 | | 1.95 | — | — | 5.9 |
| Example 50 | b | 57 | 3.0 | 39 | 100 | 100 | | 3.23 | 4.48 | 4.46 | 4.2 |
| Example 51 | b | | 4.5 | 39 | 100 | 100 | | 3.46 | 5.20 | 5.01 | 4.7 |
| Example 52 | b | | 6.0 | 31 | 70 | 90 | | 3.81 | — | 4.36 | 4.9 |
| Example 53 | b | | | 32 | 80 | 90 | | 4.22 | 5.81 | — | 5.0 |
| Example 54 | b | | | 33 | 80 | 100 | | 3.81 | 5.61 | — | 5.1 |
| Example 55 | b | | | 34 | 90 | 90 | | 4.01 | 6.90 | — | 5.1 |
| Example 56 | b | | | 39 | 90 | 105 | | 3.93 | 6.17 | — | 5.1 |
| Example 57 | b | | | 40 | 100 | 100 | | 3.59 | 4.90 | — | 5.2 |
| Example 58 | b | | 3 | 39 | 100 | 100 | 20 | 3.02 | — | — | 4.2 |
| Example 59 | B | | 4.5 | 39 | 100 | 100 | | 2.91 | — | — | 4.7 |
| Example 60 | B | | 6 | 39 | 100 | 100 | | 3.31 | — | — | 5.2 |
| Example 61 | C | 113 | 3.0 | 40 | 100 | 100 | 40 | 2.18 | 3.11 | 2.62 | 4.2 |

6. Production of Casting 2

In addition, according to the same formulation as in the specimen of Example 44 and the same manufacturing condition as in Test 1, a casting mold and a core for manufacturing a cup with a size of about 10 cm were produced, and the molten cast iron (the pouring temperature was about 1,450° C.) was poured thereinto. As a result, it was possible to produce a casting having a smooth surface without generation of a gas during casting.

7. Test 4

Regarding the specimens of Examples 62 to 65, and Comparative Example 3, the calcium aluminate (CA1), rapid hardening cement, unclassified polyvinyl alcohol a, the vinyl acetate copolymer, and sand were mixed according to formulations shown in Table 4 to produce powder mixtures (hydraulic composition containing no water). Here, in Comparative Example 4, mineral fine powder (silica rock powder having a Blaine specific surface area of 2,000 cm²/g) was used in place of calcium aluminate (CA1) and rapid hardening cement.

Next, using the powder composition and a binding agent injection type powder lamination molding device (product name: ProJet660Pro manufactured by 3D Systems Corporation.) as an additive manufacturing device, according to a binding agent injection method, a molded article having a cross-sectional dimension with a height of 10 mm, a width of 16 mm, and a length of 80 mm was produced. In the molding conditions, the water amount set value of the device was 65% for the exterior (Shell) and 90% for the interior (Core), the water/composite binding material ratio was 30 to 32 mass %, 20° C., and the relative humidity was 60%. In addition, the molded article was subjected to air curing under conditions of 40° C. and a relative humidity of 30% for 3 hours to produce a specimen. Here, the flexural strength of the specimen was measured in the same manner as in Test 1.

As shown in Table 4, the flexural strength of the specimen of the hydraulic composition containing an inorganic binder (calcium aluminate) and a partially saponified polyvinyl alcohol was high, and the flexural strength of the specimen of the hydraulic composition further containing rapid hardening cement in the hydraulic composition was higher.

TABLE 4

| | Calcium aluminate Content (parts by mass) | Mineral fine powder Content (parts by mass) | Rapid hardening cement Content (parts by mass) | Polymer | | | Sand Content (parts by mass) | Flexural strength at a material age of 3 days (N/mm²) |
|---|---|---|---|---|---|---|---|---|
| | | | | Type | Degree of saponification | Content (parts by mass) | | |
| Example 62 | 100 | — | 0 | a | 87-89 | 6 | 200 | 1.13 |
| Example 63 | 90 | — | 10 | a | 87-89 | 9 | 200 | 1.95 |

TABLE 4-continued

|  | Calcium aluminate Content (parts by mass) | Mineral fine powder Content (parts by mass) | Rapid hardening cement Content (parts by mass) | Polymer Type | Polymer Degree of saponification | Polymer Content (parts by mass) | Sand Content (parts by mass) | Flexural strength at a material age of 3 days (N/mm²) |
|---|---|---|---|---|---|---|---|---|
| Example 64 | 90 | — | 10 | a | 87-89 | 12 | 200 | 2.30 |
| Example 65 | 90 | — | 10 | v | — | 9 | 200 | 1.12 |
| Comparative Example 3 | 100 | — | — | — | — | — | 200 | 0.82 |
| Comparative Example 4 | — | 100 | — | a | 87-89 | 6 | 200 | 0.46 |

8. Test 5

Regarding the molded articles of Examples 66 to 87, 90 parts by mass of the calcium aluminate (CA1), 10 parts by mass of rapid hardening cement, 200 parts by mass of sand, and the polyvinyl alcohol were mixed according to formulations shown in Table 5 to produce a powder mixture (hydraulic composition containing no water).

Next, according to the water amount set value of the device and the water/composite binding material ratio shown in Table 5, under conditions of 20° C., and a relative humidity of 60%, according to a binding agent injection method, a molded article having a cross-sectional dimension with a width of 10 mm, a width of 16 mm, and a length of 80 mm was produced. In addition, the molded article was subjected to air curing under conditions of 20° C. or 40° C., and a relative humidity of 30% for 3 hours to produce a specimen.

In manufacture of the molded article by the device, a predetermined position on the powder mixture was selected, a water amount set value of the device was adjusted, water was injected to the exterior and the interior of the powder mixture via a nozzle, and the powder mixture was solidified. Here, the flexural strength of the specimen was measured in the same manner as in Test 1.

As shown in Table 5, the flexural strength of a specimen of a hydraulic composition obtained by simultaneously pulverizing an inorganic binder (calcium aluminate) and a polyvinyl alcohol was high.

TABLE 5

|  | Polyvinyl alcohol Type | Polyvinyl alcohol Average particle diameter (μm) | Polyvinyl alcohol Content (parts by mass) | Water/composite binding material ratio (mass %) | Water amount set value of device Exterior (Shell %) | Water amount set value of device Interior (Core %) | Curing temperature (° C.) | Flexural strength at a material age of 3 hours (N/mm²) |
|---|---|---|---|---|---|---|---|---|
| Example 66 | A | 60 | 1.5 | 41 | 100 | 100 | 40 | 1.77 |
| Example 67 | A |  | 1.5 | 60 | 150 | 150 |  | 2.42 |
| Example 68 | a |  | 3.0 | 40 | 100 | 100 |  | 2.15 |
| Example 69 | a |  | 3.0 | 46 | 120 | 120 |  | 1.95 |
| Example 70 | a |  | 3.0 | 58 | 150 | 150 |  | 2.15 |
| Example 71 | a |  | 4.5 | 40 | 100 | 100 |  | 2.46 |
| Example 72 | a |  | 6.0 | 40 | 100 | 100 |  | 3.48 |
| Example 73 | a |  | 6.0 | 46 | 120 | 120 |  | 2.70 |
| Example 74 | a |  | 6.0 | 57 | 150 | 150 |  | 2.10 |
| Example 75 | b | 57 | 3.0 | 40 | 100 | 100 | 40 | 3.23 |
| Example 76 | b |  | 4.5 | 39 | 100 | 100 |  | 3.46 |
| Example 77 | b |  | 6.0 | 31 | 70 | 90 |  | 3.81 |
| Example 78 | b |  | 6.0 | 34 | 90 | 90 |  | 4.01 |
| Example 79 | b |  | 6.0 | 40 | 100 | 100 |  | 3.59 |
| Example 80 | b |  | 3.0 | 39 | 100 | 100 | 20 | 3.02 |
| Example 81 | b |  | 4.5 | 39 | 100 | 100 |  | 2.91 |
| Example 82 | b |  | 6.0 | 39 | 100 | 100 |  | 3.31 |
| Example 83 | c | 113 | 3.0 | 40 | 100 | 100 | 40 | 2.18 |
| Example 84 | a106 | 106 | 1.5 | 41 | 100 | 100 |  | 2.25 |
| Example 85 | a63 | 63 | 1.5 | 39 | 100 | 100 |  | 2.55 |
| Example 86 | a38 | 38 | 1.5 | 40 | 100 | 100 |  | 2.27 |
| Example 87 | X | — | 3.0 | 39 | 100 | 100 |  | 3.49 |

Note)
Content indicates parts by mass of polyvinyl alcohol with respect to 100 parts by mass of the inorganic binder.

Note)
Since Example 87 was a simultaneously pulverized product, it was not possible to measure the average particle diameter of the polyvinyl alcohol alone.

9. Test 6

90 parts by mass of the calcium aluminate (CA1), 10 parts by mass of rapid hardening cement, 200 parts by mass of sand, and the polyvinyl alcohol were mixed according to formulations shown in Table 6 to produce a powder mixture (hydraulic composition containing no water). Here, the molded article was produced, and the flexural strength of the specimen was measured in the same manner as in Test 1.

As shown in Table 6, the smaller the particle diameter of the polymer is, the higher the flexural strength is and the smaller the difference in dimension is.

TABLE 6

| | Polyvinyl alcohol | | | Sand (parts by mass) | Water/composite binding material ratio (%) | Water amount set value of device | | Curing temperature (° C.) | Flexural strength (N/mm$^2$) | | |
|---|---|---|---|---|---|---|---|---|---|---|---|
| | Type | Average particle diameter (μm) | Content (parts by mass) | | | Exterior (shell %) | Interior (core %) | | Material age of 3 hours | Material age of 24 hours | Material age of 72 hours |
| Example 88 | a | 47 | 3.0 | 200 | 40 | 100 | 100 | 40 | 2.15 | 3.46 | 4.20 |
| Example 89 | a | 47 | 4.5 | 200 | 40 | 100 | 100 | 40 | 2.46 | 3.74 | 3.93 |
| Example 90 | a | 47 | 6.0 | 200 | 30 | 65 | 90 | 40 | 2.20 | — | 2.09 |
| Example 91 | a | 47 | 6.0 | 200 | 40 | 100 | 100 | 40 | 3.48 | 5.12 | 4.60 |
| Example 92 | a | 47 | 6.0 | 200 | 41 | 100 | 100 | 40 | 3.20 | — | 3.83 |
| Example 93 | a | 47 | 9.0 | 200 | 30 | 65 | 90 | 40 | 1.95 | — | — |
| Example 94 | a | 47 | 1.5 | 200 | 41 | 100 | 100 | 40 | 1.77 | — | 2.53 |
| Example 95 | a | 47 | 1.5 | 200 | 60 | 150 | 150 | 40 | 2.42 | — | 6.47 |
| Example 96 | a | 47 | 3.0 | 200 | 46 | 120 | 120 | 40 | 1.95 | 3.72 | 4.67 |
| Example 97 | a | 47 | 3.0 | 200 | 58 | 150 | 150 | 40 | 2.15 | 6.67 | 5.75 |
| Example 98 | a | 47 | 6.0 | 200 | 46 | 120 | 120 | 40 | 2.70 | — | 5.83 |
| Example 99 | a | 47 | 6.0 | 200 | 57 | 150 | 150 | 40 | 2.10 | — | 8.58 |
| Example 100 | b | 57 | 3.0 | 200 | 39 | 100 | 100 | 40 | 3.23 | 4.48 | 4.46 |
| Example 101 | b | 57 | 4.5 | 200 | 39 | 100 | 100 | 40 | 3.46 | 5.20 | 5.01 |
| Example 102 | b | 57 | 6.0 | 200 | 31 | 70 | 90 | 40 | 3.81 | — | 4.36 |
| Example 103 | b | 57 | 6.0 | 200 | 32 | 80 | 90 | 40 | 4.22 | 5.81 | — |
| Example 104 | b | 57 | 6.0 | 200 | 33 | 80 | 100 | 40 | 3.81 | 5.61 | — |
| Example 105 | b | 57 | 6.0 | 200 | 34 | 90 | 90 | 40 | 4.01 | 6.90 | — |
| Example 106 | b | 57 | 6.0 | 200 | 39 | 90 | 105 | 40 | 3.93 | 6.17 | — |
| Example 107 | b | 57 | 6.0 | 200 | 39 | 100 | 100 | 40 | 3.59 | 4.90 | — |
| Example 108 | b | 57 | 3.0 | 200 | 39 | 100 | 100 | 20 | 3.02 | — | — |
| Example 109 | b | 57 | 4.5 | 200 | 39 | 100 | 100 | 20 | 2.91 | — | — |
| Example 110 | b | 57 | 6.0 | 200 | 39 | 100 | 100 | 20 | 3.31 | — | — |
| Example 111 | c | 113 | 3.0 | 200 | 40 | 100 | 100 | 40 | 2.18 | 3.11 | 2.62 |
| Example 112 | a106 | 106 | 1.5 | 200 | 41 | 100 | 100 | 40 | 2.25 | 2.96 | — |
| Example 113 | a63 | 63 | 1.5 | 200 | 39 | 100 | 100 | 40 | 2.55 | 2.82 | — |
| Example 114 | a38 | 38 | 1.5 | 200 | 40 | 100 | 100 | 40 | 2.27 | 2.10 | — |
| Example 115 | a106 | 106 | 3.0 | 200 | 41 | 100 | 100 | 40 | 1.26 | 2.71 | — |
| Example 116 | a63 | 63 | 3.0 | 200 | 41 | 100 | 100 | 40 | 1.50 | 2.44 | — |
| Example 117 | a38 | 38 | 3.0 | 200 | 40 | 100 | 100 | 40 | 1.65 | 2.28 | — |
| Example 118 | X | — | 3.0 | 200 | 39 | 100 | 100 | 40 | 3.49 | 4.88 | 4.57 |

TABLE 6-continued

| | | Difference in dimension (%) | | | | | Ease of de-powdering | Blow out of powder | Separation | Bleeding |
|---|---|---|---|---|---|---|---|---|---|---|
| | | Material age of 3 hours | | Material age of 24 hours | | Material age of 72 hours | | | | |
| | | Width | Height | Width | Height | Width | Height | ○: favorable, Δ: small amount, X: great | | | |
| Example 88 | | 2 | 4 | 2 | 3 | 3 | 5 | ○ | ○ | ○ | ○ |
| Example 89 | | 2 | 2 | 1 | 2 | 4 | 5 | ○ | ○ | ○ | ○ |
| Example 90 | | −1 | 2 | — | — | 0 | 3 | ○ | ○ | ○ | ○ |
| Example 91 | | 1 | 2 | 1 | 1 | 1 | 3 | ○ | ○ | ○ | ○ |
| Example 92 | | 1 | 3 | — | — | 1 | 5 | ○ | ○ | ○ | ○ |
| Example 93 | | 1 | 3 | — | — | — | — | ○ | ○ | ○ | ○ |
| Example 94 | | 8 | 9 | — | — | 2 | 10 | Δ | X | ○ | X |
| Example 95 | | 24 | 18 | — | — | — | — | ○ | ○ | ○ | X |
| Example 96 | | 3 | 5 | 8 | 11 | 6 | 12 | ○ | ○ | ○ | X |
| Example 97 | | 11 | 13 | 7 | 8 | 16 | 14 | X | ○ | ○ | X |
| Example 98 | | 2 | 5 | — | — | 2 | 3 | ○ | ○ | ○ | ○ |
| Example 99 | | 4 | 6 | — | — | 5 | 6 | ○ | ○ | X | Δ |
| Example 100 | | 4 | 5 | 3 | 5 | 2 | 5 | ○ | ○ | ○ | ○ |
| Example 101 | | 2 | 3 | 2 | 3 | 1 | 2 | ○ | ○ | ○ | ○ |
| Example 102 | | — | — | — | — | 1 | 2 | ○ | ○ | ○ | ○ |
| Example 103 | | — | — | 1 | 2 | — | — | ○ | ○ | ○ | ○ |
| Example 104 | | — | — | 2 | 2 | — | — | ○ | ○ | ○ | ○ |
| Example 105 | | — | — | 3 | 3 | — | — | ○ | ○ | ○ | ○ |
| Example 106 | | — | — | 2 | 3 | — | — | ○ | ○ | ○ | ○ |
| Example 107 | | 1 | 2 | 2 | 2 | — | — | ○ | ○ | ○ | ○ |
| Example 108 | | 2 | 5 | — | — | — | — | ○ | ○ | ○ | ○ |
| Example 109 | | 2 | 4 | — | — | — | — | ○ | ○ | ○ | ○ |
| Example 110 | | 1 | 2 | — | — | — | — | ○ | ○ | ○ | ○ |
| Example 111 | | 8 | 9 | 10 | 9 | 7 | 8 | ○ | ○ | ○ | X |
| Example 112 | | 11 | 14 | — | — | — | — | ○ | ○ | ○ | X |
| Example 113 | | 4 | 5 | 4 | 6 | — | — | ○ | ○ | ○ | Δ |
| Example 114 | | 2 | 6 | 2 | 5 | — | — | ○ | ○ | ○ | Δ |
| Example 115 | | 2 | 5 | — | — | — | — | ○ | ○ | ○ | ○ |
| Example 116 | | 4 | 5 | 1 | 4 | — | — | ○ | ○ | ○ | ○ |
| Example 117 | | 0 | 2 | 0 | 2 | — | — | ○ | ○ | ○ | ○ |
| Example 118 | | 3 | 3 | 3 | 2 | 2 | 3 | ○ | ○ | ○ | ○ |

Note)
Ease of de-powdering indicates that it was possible to remove powder quickly from the molded article after molding.
Note)
Blow out of powder indicates that powder was blown out from the molded article after de-powdering.
Note)
Separation indicates that the molded article was separated in a thin plate form after de-powdering.
Note)
Bleeding indicates that water injected from a molding device was impregnated outside a spraying range.

The invention claimed is:

1. A hydraulic composition for an additive manufacturing device, comprising:
   1.5 to 14 parts by mass of a partially saponified polyvinyl alcohol having an average particle diameter of 150 μm or less with respect to 100 parts by mass of an inorganic binder.

2. The hydraulic composition for an additive manufacturing device according to claim 1, wherein the inorganic binder contains 50 to 100 mass % of a calcium aluminate with respect to 100 mass % of the entire inorganic binder.

3. The hydraulic composition for an additive manufacturing device according to claim 1, wherein the inorganic binder contains 0 to 50 mass % of rapid hardening cement with respect to 100 mass % of the entire inorganic binder.

4. The hydraulic composition for an additive manufacturing device according to claim 1, wherein the polymer polyvinyl alcohol is a polyvinyl alcohol that has been pulverized simultaneously with the inorganic binder.

5. The hydraulic composition for an additive manufacturing device according to claim 1, wherein the inorganic binder contains 0 to 50 mass % of cement of which setting initial time measured according to JIS R 5210 is within 3.5 hours with respect to 100 mass % of the entire inorganic binder.

6. The hydraulic composition for an additive manufacturing device according to claim 2, wherein the inorganic binder contains 0 to 50 mass % of cement of which setting initial time measured according to JIS R 5210 is within 3.5 hours with respect to 100 mass % of the entire inorganic binder.

7. The hydraulic composition for an additive manufacturing device according to claim 1, further comprising:
   28 to 100 parts by mass of water with respect to a total of 100 parts by mass of the inorganic binder and the polyvinyl alcohol; and
   sand.

8. The hydraulic composition for an additive manufacturing device according to claim 2, further comprising:
   28 to 100 parts by mass of water with respect to a total of 100 parts by mass of the inorganic binder and the polyvinyl alcohol; and
   sand.

9. The hydraulic composition for an additive manufacturing device according to claim 6, further comprising:
   28 to 100 parts by mass of water with respect to a total of 100 parts by mass of the inorganic binder and the polyvinyl alcohol; and
   sand.

10. The hydraulic composition for an additive manufacturing device according to claim 2, wherein the inorganic binder contains 0 to 50 mass % of rapid hardening cement with respect to 100 mass % of the entire inorganic binder.

11. The hydraulic composition for an additive manufacturing device according to claim 10, further comprising:
    28 to 100 parts by mass of water with respect to a total of 100 parts by mass of the inorganic binder and the polyvinyl alcohol; and
    sand.

12. A molded article using the hydraulic composition for an additive manufacturing device according to claim 7, wherein an ignition loss of the molded article at a material age of 3 days is 6.5 mass % or less.

13. A method of manufacturing a casting mold, comprising molding a casting mold using an additive manufacturing device and the hydraulic composition for an additive manufacturing device according to claim 7.

14. The method of manufacturing a casting mold according to claim 13, wherein a curing temperature of the casting mold is 10° C. to 100° C.

* * * * *